S. H. GILMAN.
Bale-Tie.

No. 159,258.

Patented Feb. 2, 1875.

Witnesses
J. N. Campbell
Wm. E. Chaffee

Inventor
Samuel H. Gilman
by
Mason, Fenwick & Lawrence

UNITED STATES PATENT OFFICE.

SAMUEL H. GILMAN, OF NEW ORLEANS, LOUISIANA.

IMPROVEMENT IN BALE-TIES.

Specification forming part of Letters Patent No. 159,258, dated February 2, 1875; application filed July 31, 1874.

*To all whom it may concern:*

Be it known that I, SAMUEL H. GILMAN, of New Orleans, parish of Orleans and State of Louisiana, have invented a new and Improved Tie for Baling Cotton; and I do hereby declare that the following is a full, clear, and exact description thereof, reference being had to the accompanying drawings making part of this specification.

The object of my improvement in cotton-ties is, first, to overcome the loss of "slip" and "slack" which occurs after the tie is fastened, and when the pressure of the compress is taken off and transferred to the bands and ties, which loss in the use of the best ties now used is fully two per cent.; second, to save time in fastening the tie by having no bend to make in the hoop, nor calculation, nor measurements whatever before the tie is fastened; third, to secure perfect and certain uniformity in the tension of the six hoops when tied upon a bale, without which some one of the bands is liable to break after the bale is relieved from, and generally out of, the press, thus involving the recompressing the bale and retying one hoop, which is equivalent to the loss of the price of compressing one bale; fourth, to utilize a quality of iron of equal tensile strength, but of less flexibility and cheaper than the present qualities exacted, which, to be doubled back short over sharp angles, as required by all of the present practicable ties, must be of the best tensile and flexible qualities.

Figure 1:
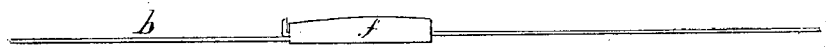
Figure 2:
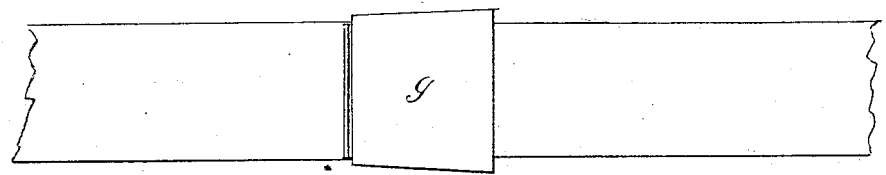
Figure 3:
Figure 4:
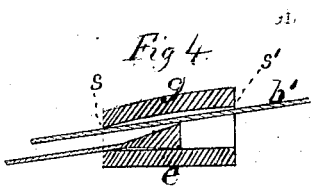
Figure 5:
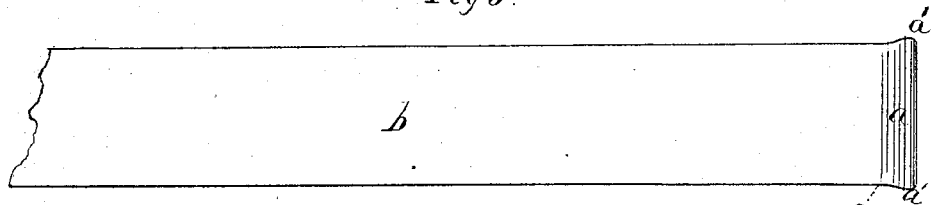
Figure 6:
Figure 7:
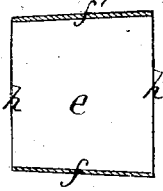
Figure 8:
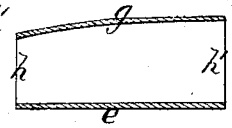
Figure 9:
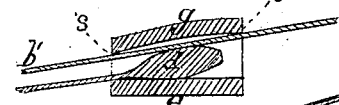
Figure 10:
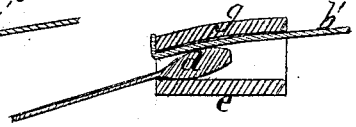
Figure 11:
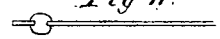
Figure 12:
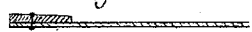

Figure 1 is a side view of my improved cotton-bale tie. Fig. 2 is a top view. Fig. 3 is a longitudinal vertical section; Fig. 4, a like section with the view enlarged. Fig. 5 is a plan view of the bale-strap. Fig. 6 is an edge view of Fig. 5. Fig. 7 is a plan view of the tie with its curved top portion removed. Fig. 8 is a longitudinal section of the tie. Fig. 9 is a sectional view of the tie with the fixed and loose portions of the strap in position at the instant the compressor is released to impart the pressure of the bale to the tie. Fig. 10 is a sectional view, showing the several parts in position after the expansion of the bale has acted upon the tie. Fig. 11 shows a button-headed rivet in the fixed end of the hoop; and Fig. 12 shows a wedge riveted to the hoop, thus forming the "fixed" end.

I accomplish the above-specified objects by first doubling over one end, $a$, of the hoop $b$ about one-quarter of one inch, and welding it down in the solid form of a flat wedge, tapering on all sides, as shown in Figs. 3 and 6, the head $a$ of the wedge forming one extreme end of the hoop, and its point $c$ being the continuation of the hook from the termination of the taper, which taper should not be over one-half inch long from the head. This is the substantial form of the fixed end of my hoop, admitting of the following variations, all of which involve the same general principle, namely, a hoop with one end permanently enlarged in any manner, so that the enlarged end cannot pass through the same space that the other portion of the hoop will pass through: First, either one or both sides of the wedge may be convex in the direction of its length, as at $d$ in Figs. 9 and 10; second, a rivet with rounded or button-shaped heads on one or both sides, riveted into the hoop near its end, as in Fig. 11, will effect the desired object; third, a separate piece of cast, malleable, or wrought iron, of the desired enlarged form, may be riveted to one end of the hoop, as shown in Fig. 12, to accomplish the desired object; fourth, the end of the hoop may be doubled over and hammered down cold and without welding to form the desired permanent enlargement of the end of the hoop.

I make a tie in the form of a flattened tapering tube, as shown in figures. The tie is about one inch long, its interior tapering in its length on its bottom side $e$, and on its two edges $f f'$, and being concave in its length on its top side $g$, its concavity being made to fit the convexity of one side of the wedge-shaped end of the hoop.

The dimensions of the interior of the tubular tie are substantially as follows: The width of the lower and narrower end $h$ of the tube inside is to be slightly more than the width of the hoop $b$ to be used. If the hoop is one inch wide it should be seventeen-sixteenths, so that the hoop can pass freely through, and its depth should be two and one-half thicknesses of the hoop, so that the two hoops can pass freely through, and while both are in the tube the fixed and enlarged end of the hoop cannot pass out at this narrow and lower end of the tie. The upper and wide end $h'$ of the interior of my tie is about three-sixteenths wider than the lower end, and deep enough for the wedge end of the hoop to enter freely when the free end is in, which will be about four thicknesses of the hoop. The two edges $f f'$ and flat side $e$ have a straight taper from top to bottom, and the opposite or top side $g$ is concaved, with its terminal points on the taper line formed by the difference in the tube of four hoop thicknesses at top, and two and one-half thicknesses at bottom. The two terminal points of the concavity being respectively the two extreme ends of the tube opposite to the flat side, the circle of the concave side must be such that the entrance $h'$ to the tube will be its widest part.

The object of the taper of the edge lines of my tie is twofold—first, to prevent the tie from slipping off over the wedge $a$, whose widened end $a'$ cannot pass out through the narrow and lower end $h$ of the tube of the tie during the handling incident to use before it is put on the bale; second, to avoid jamming the free end of the hoop when it is not exactly in the same vertical plane as the fixed end when making the connection in the press.

The object of the concavity of the interior of the top side $g$ of my tie is to give the free end $b'$ of the hoop two points of impingement, as at $s\ s'$, Figs. 4 and 9, against the tie, to one of the same for the fixed end of the hoop, at the instant of tying the hoop and loosing the bale in the press.

Thus the several objects sought for are obtained by my tie. First, there is no slip or slack. Second, there is no time lost in tying. Third, each tie will have the same tension. Fourth, there being no bends, flexibility in the iron is not required.

Having described my invention, what I claim is—

1. The combination of a hoop having a solid end with a tie made in the form of a flattened tube, both edges of which taper from top to bottom, and with one side flat, while the opposite side is concave on a line tapering from top to bottom, all substantially as and for the purpose described.

2. A hoop for baling purposes, with the extreme head of the wedge on its end wider than any other part, substantially as described, and for the purposes set forth.

3. A tie for uniting the two ends of bale-hoops, constructed in the form of a section of a flattened tapering tube, tapering in its tube on straight lines from one end to the other on its two edges and on its bottom side, and concave on a corresponding taper line on the upper or top side, all substantially as described, and for the purpose set forth.

SAMUEL H. GILMAN.

Witnesses:
B. T. JOAFSLEE,
P. A. COHEN.